US012561076B2

(12) United States Patent　(10) Patent No.:　US 12,561,076 B2
Fitzpatrick et al.　(45) Date of Patent:　Feb. 24, 2026

(54) PERSISTENT MEMORY ACROSS UPDATES

(71) Applicant: SK Hynix NAND Product Solutions Corp., Rancho Cordova, CA (US)

(72) Inventors: Matthew Fitzpatrick, Valley Springs, CA (US); Craig Valine, Windsor, CO (US); Kailaash Rajagopalan, Folsom, CA (US); Mahesh Govindane, Sunnyvale, CA (US); Sam Povilus, Boulder, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/747,185

(22) Filed: Jun. 18, 2024

(65) Prior Publication Data

US 2025/0383798 A1　Dec. 18, 2025

(51) Int. Cl.
　　*G06F 3/06*　　　(2006.01)
(52) U.S. Cl.
　　CPC .......... *G06F 3/0631* (2013.01); *G06F 3/0604* (2013.01); *G06F 3/0673* (2013.01)
(58) Field of Classification Search
　　CPC ..... G06F 3/0631; G06F 3/0604; G06F 3/0673
　　See application file for complete search history.

(56) References Cited

U.S. PATENT DOCUMENTS

| | | | |
|---|---|---|---|
| 2004/0158828 A1 | 8/2004 | Zimmer et al. | |
| 2007/0136385 A1* | 6/2007 | Abrashkevich | ....... G06F 11/366 |

| | | | |
|---|---|---|---|
| 2012/0023319 A1 | 1/2012 | Chin et al. | |
| 2018/0046374 A1 | 2/2018 | Marathe et al. | |
| 2018/0165101 A1* | 6/2018 | Bulusu | ................ G06F 11/1438 |
| 2021/0034354 A1 | 2/2021 | Lee et al. | |
| 2021/0117176 A1* | 4/2021 | Watt | .......................... G06F 8/71 |
| 2021/0357204 A1* | 11/2021 | Nachimuthu | ........... G06F 8/656 |
| 2022/0413840 A1* | 12/2022 | Mooney | .............. G06F 11/1417 |
| 2023/0305834 A1* | 9/2023 | Kumar | .................. G06F 9/4418 |

FOREIGN PATENT DOCUMENTS

WO　　2024/066611 A1　　4/2024

\* cited by examiner

*Primary Examiner* — Edward J Dudek, Jr.
(74) *Attorney, Agent, or Firm* — HG LAW LLP

(57)　　　　　　ABSTRACT

A method for updating a device includes receiving an instruction to update from a first configuration in the device to a second configuration, where a first heap memory allocated to the first configuration includes multiple first allocated memory blocks and corresponding first memory blocks metadata. The method also includes performing a warm reset, the reset including determining, based on the first memory blocks metadata, that when updating from the first configuration to the second configuration, data of at least one of the first allocated memory blocks should be persisted to a second heap memory allocated to the second configuration, and causing the device to update from the first configuration to the second configuration, where the update includes persisting, based on the first memory blocks metadata, the data of at least one of the first allocated memory blocks to a second heap memory allocated to the second configuration.

17 Claims, 5 Drawing Sheets

200

300

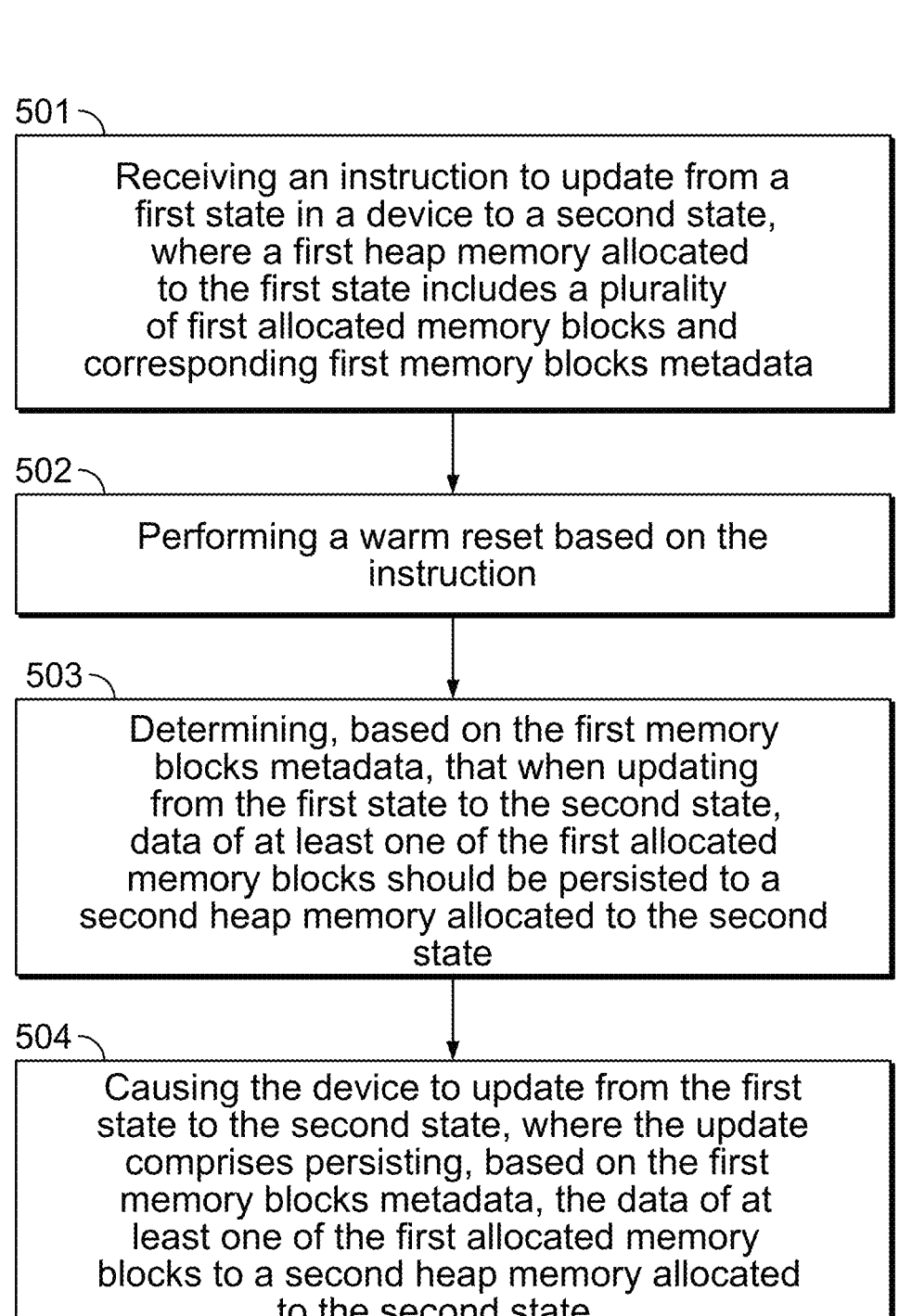

500

501

Receiving an instruction to update from a first state in a device to a second state, where a first heap memory allocated to the first state includes a plurality of first allocated memory blocks and corresponding first memory blocks metadata

502

Performing a warm reset based on the instruction

503

Determining, based on the first memory blocks metadata, that when updating from the first state to the second state, data of at least one of the first allocated memory blocks should be persisted to a second heap memory allocated to the second state

504

Causing the device to update from the first state to the second state, where the update comprises persisting, based on the first memory blocks metadata, the data of at least one of the first allocated memory blocks to a second heap memory allocated to the second state

FIG. 5

PERSISTENT MEMORY ACROSS UPDATES

TECHNICAL FIELD

The present disclosure is directed to methods and systems for persisting memory when updating a device (e.g., from a first configuration to a second configuration, including updating or installing firmware on the device).

BACKGROUND

Computers and related devices use memory to store information and execute processing. Various approaches for the usage of computer memory can influence the efficiency of computer processing.

SUMMARY

In accordance with the present disclosure, methods, systems, and data structures are provided for persisting memory when updating a device (e.g., updating firmware of the device). For example, during an update of a device from a first configuration (e.g., an old, initial, or pre-updated state or firmware) to a second configuration (e.g., a new, final, or post-updated state or firmware), certain portions of data (e.g., memory blocks) stored in memory of the device and associated with the first configuration may also be included in data of the second configuration. To accelerate the update, prior to realizing the second configuration, processing circuitry (e.g., of the storage device or of a storage device host) may determine and cause one or more portions of data to be persisted (e.g., retained in memory) through the update process. Compared to erasing all the data of the first configuration from memory and then writing all the data of the second configuration to memory, persisting data may improve the speed, efficiency, flexibility, or any combination thereof, of a firmware update or any other suitable computer update.

In accordance with some aspects of the present disclosure, a method for updating a device includes receiving an instruction to update from a first configuration in the device to a second configuration, where a first heap memory allocated to the first configuration includes multiple first allocated memory blocks and corresponding first memory blocks metadata, and the instruction includes an indication of whether to update using a cold reset or a warm reset. The method also includes performing the warm reset based on the indication, where performing the warm reset includes determining, based on the first memory blocks metadata, that when updating from the first configuration to the second configuration, data of at least one of the first allocated memory blocks should be persisted to a second heap memory allocated to the second configuration, and causing the device to update from the first configuration to the second configuration, where the update includes persisting, based on the first memory blocks metadata, the data of at least one of the first allocated memory blocks to a second heap memory allocated to the second configuration.

In some embodiments, memory of the device stores a first data structure, the first data structure stores data that is associated with the first memory blocks metadata, and the determining that the data of at least one of the first allocated memory blocks should be persisted is based on reading the first data structure.

In some embodiments, the first data structure includes pointers to respective metadata of the first memory blocks metadata, reading the first data structure includes following the pointers, the first memory blocks metadata include respective block tags; and reading the first data structure includes, based on following the pointers, reading the respective block tags.

In some embodiments, the method also includes dividing the first heap memory into at least two portions of the first heap memory by assigning a static address between respective portions of the at least two portions of the first heap memory, where a first portion of the at least two portions includes the at least one first allocated memory block storing the data that should be persisted, and a second portion of the at least two portions includes at least one first allocated memory storing data that should not be persisted.

In some embodiments, the second heap memory allocated to the second configuration includes a second set of multiple allocated memory blocks, and performing the warm reset further includes generating second memory blocks metadata corresponding to the second set of multiple allocated memory blocks, generating a second data structure storing data that is associated with the second memory blocks metadata, storing the second memory blocks metadata in the second heap memory allocated to the second configuration, and storing the second data structure in memory of the device.

In some embodiments, the storing the second memory blocks metadata includes storing respective portions of the second memory blocks metadata adjacent to the corresponding memory block of the second set of multiple allocated memory blocks.

In some embodiments, the first configuration is based on a first firmware and the second configuration is based on a second firmware, different from the first firmware.

In some embodiments, persisting, based on the first memory blocks metadata, the data of at least one of the first allocated memory blocks, is further based on at least one property of the second configuration.

In accordance some aspects of the present disclosure, a system includes a first heap memory allocated to a first configuration, the first heap memory including multiple first allocated memory blocks and corresponding first memory blocks metadata, and control circuitry coupled to the first heap memory, the control circuitry to receive an instruction to update from the first configuration to a second configuration, where the instruction includes an indication of whether to update using a cold reset or a warm reset, and perform the warm reset based on the indication. Performing the warm reset based on the indication includes determining, based on the first memory blocks metadata, that when updating from the first configuration to the second configuration, data of at least one of the first allocated memory blocks should be persisted to a second heap memory allocated to the second configuration, and causing a device to update from the first configuration to the second configuration, where the update includes persisting, based on the first memory blocks metadata, the data of at least one of the first allocated memory blocks to a second heap memory allocated to the second configuration.

In some embodiments, memory of the device includes a first data structure, the first data structure includes data that is associated with the first memory blocks metadata, and the control circuitry is further to determine that the data of at least one of the first allocated memory blocks should be persisted based on reading the first data structure.

In some embodiments, the first data structure includes pointers to respective metadata of the first memory blocks metadata, the first memory blocks metadata include respective block tags, and the control circuitry is further to follow the pointers when reading the first data structure, and read the respective block tags based on following the pointers.

In some embodiments, the control circuitry is further to divide the first heap memory into at least two portions of the first heap memory by assigning a static address between respective portions of the at least two portions of the first heap memory, where a first portion of the at least two portions includes the at least one first allocated memory block including the data that should be persisted, and a second portion of the at least two portions includes at least one first allocated memory including data that should not be persisted.

In some embodiments, the second heap memory allocated to the second configuration includes a second set of multiple allocated memory blocks, and the control circuitry is further to perform the warm reset by generating second memory blocks metadata corresponding to the second set of multiple allocated memory blocks, generating a second data structure storing data that is associated with the second memory blocks metadata storing the second memory blocks metadata in the second heap memory allocated to the second configuration, and storing the second data structure in memory of the device.

In some embodiments, the control circuitry is also to store respective portions of the second memory blocks metadata adjacent to the corresponding memory block of the second set of multiple allocated memory blocks.

In some embodiments, the first configuration is based on a first firmware and the second configuration is based on a second firmware, different from the first firmware.

In some embodiments, the control circuitry is also to persist the data of at least one of the first allocated memory blocks further based on at least one property of the second configuration.

In accordance with some aspects of the present disclosure, a data structure for maintaining information about memory blocks includes a parent node including pointers to multiple child nodes, and multiple child nodes, where each child node of the multiple child nodes is associated with a respective memory block of the memory blocks and includes multiple values. The multiple values includes a size of the respective memory block, an identifier for a subsequent memory block to the respective memory block, and a respective block tag associated with the respective memory block.

In some embodiments, the pointers to multiple child nodes include pointers to a first allocated block of the memory blocks and a first free block of the memory blocks.

In some embodiments, the parent node further includes a value including an amount of free space in the memory blocks.

In some embodiments, data of the respective block tag indicates whether to persist, during an update from a first configuration to a second configuration, data of the respective memory block.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 5 shows a flowchart of illustrative steps for persisting memory through a device update, in accordance with some embodiments of the present disclosure.

DETAILED DESCRIPTION

Figure 1:
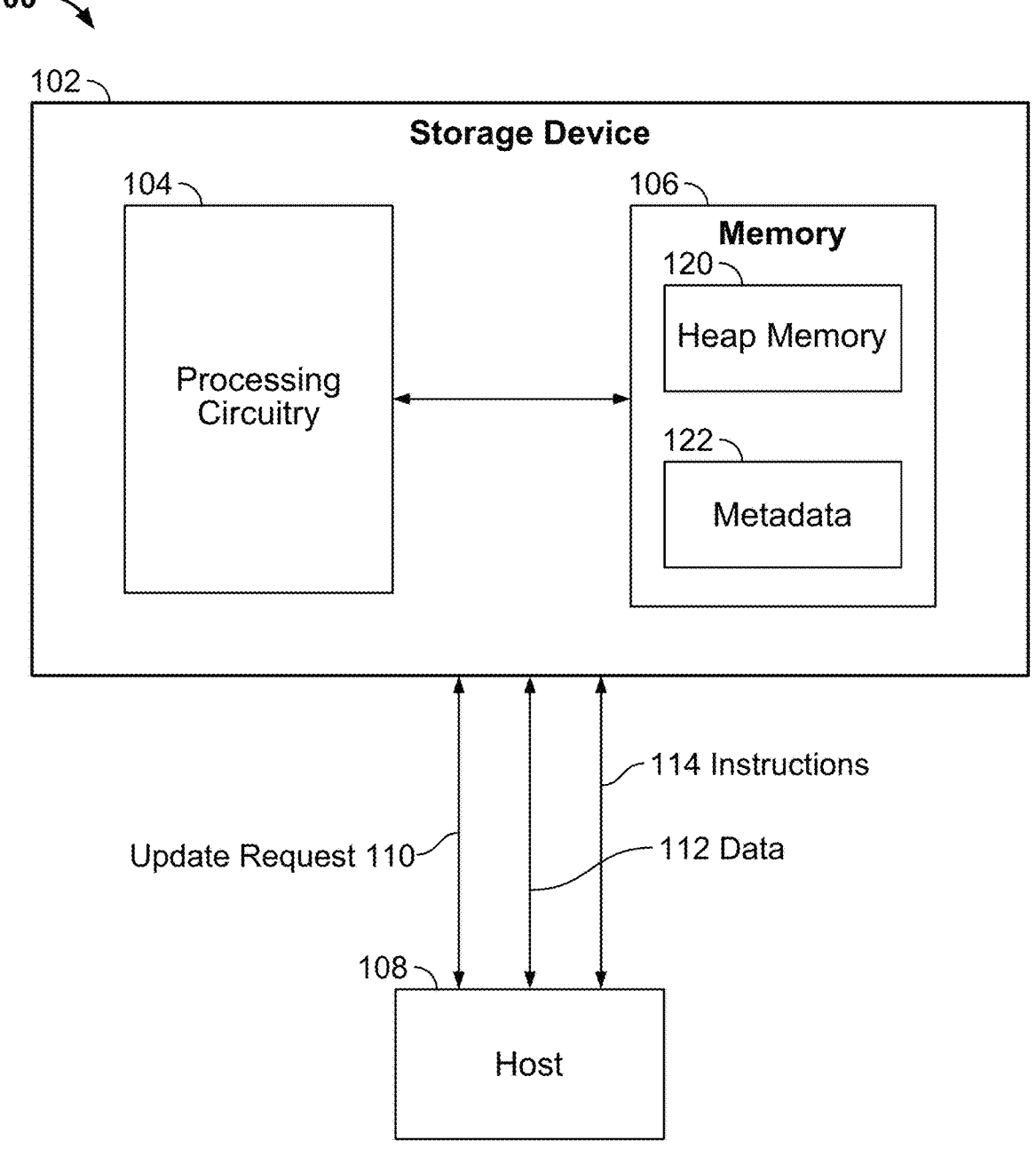
FIG. 1 shows a storage device and a host configured to update the device, in accordance with some embodiments of the present disclosure.

Firmware is software that links physical hardware and operational software systems. Firmware may be installed directly onto an electronic device (e.g., a computer, storage device, server, processor, communication device, any other suitable electronic device, or any combination thereof) during manufacturing. Later, firmware updates and other firmware modifications may be installed such as for instantiating dynamic updates, debugging (e.g., identifying or resolving functional issues), replacing or fixing older firmware releases, providing new functionality, removing existing functionality, any other desired function, or any combination thereof.

A device update (e.g., from a first configuration to a second configuration, including a firmware update) may be executed by processing circuitry of a device in response to receiving instructions. These instructions may cause the device to perform a cold reset (e.g., during which all electronics of the device are completed powered down) or a warm reset (e.g., during which power is continually provided to at least a portion of the electronics of the device). During such updates, all (or nearly all) of the old data (e.g., associated with a first firmware or configuration) may be erased from memory of the device, and all (or nearly all) of the new data (e.g., associated with a second firmware or configuration) may be written to the memory of the device. However, some (or most) of the new data may be the same as the old data.

Due to at least these erasing and writing processes, device updates cause the device to experience downtime (e.g., a period during which the device cannot perform its intended function due to being wholly or partially powered down). It is desirable to minimize the downtime associated with device updates. A device update may be accelerated by the device persisting (e.g., maintaining from a pre-updated configuration through a post-updated configuration) the data from the first firmware (or other pre-updated configuration) that is also used in the second firmware (or other post-updated configuration).

In accordance with embodiments of the present disclosure, methods, systems, and one or more data structures are provided for persisting memory across device updates. A data structure includes a list (e.g., a linked list) that stores and/or points to metadata. The list includes addresses and/or other information characterizing at least a first free memory block and a first allocated memory block. The information of the list causes the metadata to be accessible to the processing circuitry updating the device. Respective portions of the metadata provide information about corresponding respective allocated memory blocks (e.g., of heap memory of a device). For example, each portion of metadata may include a unique block tag (or other identifier) for each allocated memory block.

When receiving an instruction to update from a first configuration or first firmware to a second configuration or second firmware using a warm reset, processing circuitry reads the metadata (e.g., based on reading the list) and determines, based on the unique block tag and/or another identifier, which portions of the data that are currently stored on the device are used in both the first and second configurations or firmware. In other words, the processing circuitry determines which data (e.g., which allocated memory blocks) can be persisted through the device update. This determination additionally may be based on properties of the second configuration or firmware.

In some embodiments, data persisted from the first configuration to the second configuration include a band state of the memory cells (e.g., whether a band of NAND or other memory is erased, programmed, or otherwise reconfigured). For example, the band state of the memory may not change over a firmware oar other device update. If the band state does not change, then the second configuration of the device can reuse the first band state, rather than the processing circuitry having to scan and replay the first configuration of the device when configuring the second configuration of the device. In some embodiments, data persisted from the first configuration to the second configuration include statistics of the memory that should be persisted. In some embodiments, data persisted from the first configuration to the second configuration include a logical-to-physical (L2P) mapping of the memory.

Having determined which data can be persisted, the processing circuitry causes the firmware to update without erasing the data to be persisted. As a result, during the device update, the processing circuitry may only delete data that is not needed after the device update and may only write data that was not stored on the device prior to the device update. Thus, the speed of the device update may be improved, and a device downtime associated with the update may be reduced.

During or after the update, additional benefits may be derived from additional use of the data structure. Processing circuitry may use the data structure to dynamically allocate memory that can scale based on relevant hardware and firmware properties. Processing circuitry may use the data structure for freeing, resizing, or otherwise configuring previously allocated memory. Processing circuitry may use the data structure to partition one or more heaps of memory with increased granularity. Processing circuitry may use the data structure to minimize the extent to which properties (e.g., the size of the heap memory that is allocated to the firmware) associated with the update need to be kept consistent between the pre-updated configuration and the post-updated configuration.

In some embodiments, devices rely on indirect memory addressing (e.g., using objects such as a static linker map). With indirect memory addressing, the locations of allocated blocks need not be stored. Rather, only the location of a next free block may be stored. Therefore, processing circuitry does not have access to a data structure (or information that is stored in the data structure) for traversing allocated blocks and persisting the allocated blocks storing data that are used before and after the device update. As a result, indirect memory addressing may require static memory allocations between two updates.

In some embodiments, the one or more data structure described herein, and the corresponding systems and methods for using the data structure, causes a device to store and retrieve the location of at least one allocated memory block, such that consistent memory allocation may not be required between a new firmware and an old firmware (which may or may not be equal in size), or between any other suitable new and old configurations of a device.

The subject matter of this disclosure is further discussed with reference to FIGS. 1-5.

FIG. 1 shows a storage device that is communicatively coupled to a host configured to cause the device to update, in accordance with some embodiments of the present disclosure. The storage device 102 includes processing circuitry 104 and memory 106. The processing circuitry can at least write to, read from, and erase from, memory cells of memory 106. The host 108 can cause processing circuitry 104 to perform these actions on memory 106. For example, the actions may be performed by processing circuitry 104 based on update request 110, data 112, or instructions 114, any other suitable signal or information, or any combination thereof.

In some embodiments, update request 110 is a firmware update or installation request, or any other suitable device update request. Data 112 includes data of the update (e.g., data of the firmware) and may additionally include metadata of the device update or any other suitable data or metadata. Instructions 114 includes instructions for whether to perform a cold reset or a warm reset. In response to instructions 114 including an indication to perform a warm reset, processing circuitry 104 is configured to persist a portion of data stored in memory 106, as further described below.

Memory 106 includes at least heap memory 120 and metadata 122. The systems (e.g., described in connection with at least FIGS. 1-2), data structures (e.g., described in connection with at least FIGS. 2-3), and methods (e.g., described in connection with at least FIGS. 4-5) described herein may apply to any type of system including heap memory (e.g., including systems with DRAM and/or SRAM). In some embodiments, heap memory 120 includes multiple heaps. Heap memory 120 may include one or more memory blocks storing data. At least one of these memory blocks may be persisted by processing circuitry 104 through a firmware update or other update of storage device 102. Memory 106 also includes metadata 122. The metadata 122 may be used by processing circuitry 104 to determine whether to persist a respective memory block (or other portion of) heap memory 120, and it may also be used by processing circuitry 104 to locate a specific allocated memory block (or other portion of) heap memory 120. For example, metadata 122 may be used to write data to or erase data from memory located at or near a specific block address.

In some embodiments, storage device 102 is an SSD and the update request 110 causes a device update (e.g., a firmware update) to be installed on the SSD. The SSD is a data storage device that uses integrated circuit assemblies as memory to store data persistently. SSDs have no moving mechanical components, and this feature distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency. In some embodiments, SSDs use indirect memory addressing, which stores data into a next available physical memory address and maps the next available physical memory address to the logical memory address within an indirection table. In some embodiments, data structures are provided for additionally mapping (e.g., in a linked list, or through at least one parent node pointing to multiple child nodes) the addresses of stored data (e.g., allocated memory blocks), such that the stored data may be persisted by the SSD through a firmware update or other update to the SSD.

Figure 2:
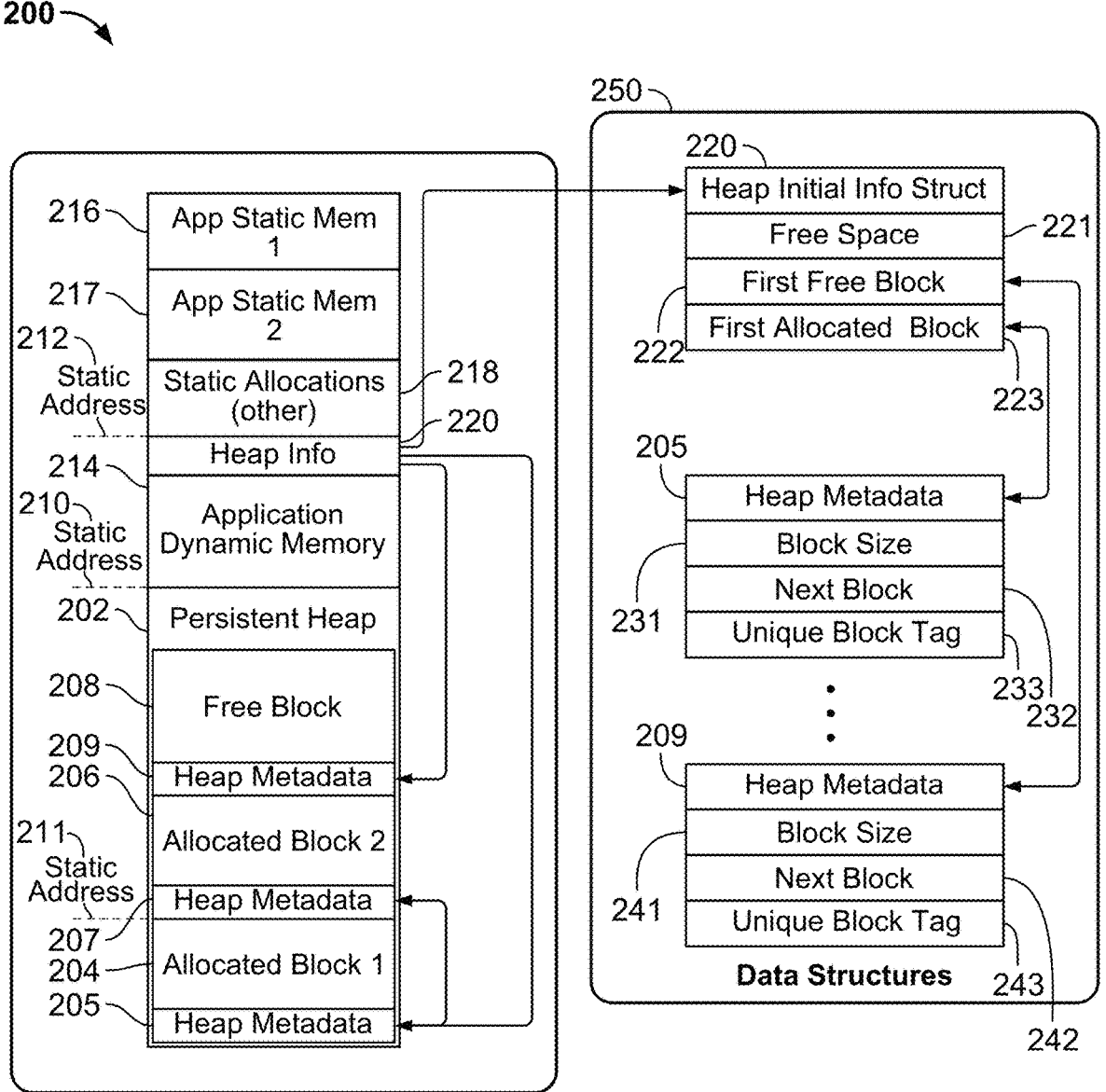
FIG. 2 shows a memory allocation and a data structure for updating a device, in accordance with some embodiments of the present disclosure.

FIG. 2 shows a block diagram of a memory allocation approach and illustrative data structures for persisting memory through updating a device, in accordance with some embodiments of the present disclosure. In some embodiments, the memory 200 includes multiple memory blocks (e.g., blocks 202-220) and corresponds to memory 106 (e.g., including heap memory 120 and metadata 122). In some embodiments, the blocks of memory 200 correspond to a physical scheme for allocating the memory (e.g., where a respective block of metadata is located next to a corresponding block of heap memory); in other embodiments, the respective blocks of metadata may be stored in a specific and shared location, may be distributed among any open cells of the heap memory, may be otherwise located away from the corresponding block of heap memory, or any combination thereof.

Persistent heap 202 is a portion of memory (e.g., heap memory 120) that includes one or more allocated memory blocks (e.g., allocated block 1 204 and allocated block 2 206), an optional free memory block (e.g., free block 208), and a corresponding number of heap metadata portions (e.g., heap metadata 205, heap metadata 207, and heap metadata 209), where each respective metadata portion is associated with a corresponding memory block (as indicated by respective metadata portions bordering respective memory blocks). In some embodiments, each respective metadata portion is associated with one and only one memory block. In some embodiments, the persistent heap may span from the end of a portion of dynamic memory to the end of an available portion of DRAM.

In some embodiments, each portion of metadata (e.g., heap metadata 205, as is associated with allocated block 1 204), stores the information listed under heap metadata 205 and heap metadata 209 (as shown within data structures 250). This information includes a block size (e.g., block size 241, which may describe an amount of memory within a block), a next block address (e.g., next block 242, which may describe a static address associated with a neighboring memory block), and a unique block tag (e.g., unique block tag 243, which may identify a feature of the block that is used for persisting the memory of the block during a firmware update). Processing circuitry 104 may read each portion of metadata and, based on the values that were read, determine (e.g., based on a value of the unique block tag or any other information stored in the first metadata) whether data of the corresponding allocated memory block should be persisted through a device update. In some embodiments, the determination is further made based on information provided by the host 108 (e.g., the information related to the new firmware or configuration). In some embodiments, persisting the data of an allocated memory block includes persisting the entire block.

In some embodiments, the memory 200 includes heap initial information ("info") structure 220. As shown within data structures 250, the heap initial information structure 220 includes at least free space 221, which indicates an amount of free memory in the persistent heap 202, first free block 222, which indicates an address or other identifier of a first free block (e.g., free block 208) in the persistent heap 202, and first allocated block 223, which indicates an address or other identifier of a first allocated block (e.g., allocated block 1 204) in the persistent heap 202. In some embodiments, the data structure (e.g., as described at least in connection with FIG. 3) is the heap initial information structure 220; in some embodiments, the data structure additionally includes at least one heap metadata (e.g., any one or more of heap metadata 205, 207, 209, or other heap metadata not shown). As discussed above, the heap initial information structure 220 stores an address (e.g., first allocated block 223) of at least the first allocated memory block, such that during the device update, processing circuitry can directly access this block and other blocks stored in subsequent portions of the memory.

In the illustrative implementation shown in FIG. 2, heap metadata 205 is associated with allocated block 1 204 and therefore with first allocated block 223, while heap metadata 209 is associated with free block 208 and therefore with first free block 222. In some embodiments, heap initial information structure 220 is a first data structure stored in a device (e.g., storage device 102). The heap initial information structure 220 stores data (e.g., first free block 222 and first allocated block 223) that is associated with the first memory blocks metadata (e.g., heap metadata 205 and heap metadata 209). Processing circuitry 104 is configured to read the heap initial information structure 220 and determine that data of at least one allocated memory block (e.g., at least one of allocated block 1 204 or allocated block 2 206) should be persisted during a firmware update.

In some embodiments, the heap initial information structure 220 includes pointers (e.g., first free block 222 and first allocated block 223) to respective metadata (e.g., heap metadata 205 and heap metadata 209) of the first memory blocks metadata. Reading the heap initial information structure 220 includes following these pointers. Because the metadata include respective block tags (e.g., unique block tag 233 and unique block tag 243), reading the data and following the pointers includes reading the respective block tags.

In some embodiments, memory 200 includes optional static address 211, which partitions persistent heap 202. It is noted that processing circuitry may assign one or more static address 211 to any one or more location in persistent heap 202. Static address 211 may partition persistent heap 202 into at least two portions, where a first portion of the persistent heap is persisted through a firmware update and a second portion of the persistent heap is not persisted (e.g., is deleted and rewritten) through the firmware update.

Memory 200 additionally includes application ("app") static memory ("mem") 1 216, application ("app") static memory ("mem") 2 217, static allocations (other) 218, and application dynamic memory 214. These portions of the memory can be used during the execution of various functions of storage device 102 and/or other processors connected to storage device 102.

Memory 200 also includes static address 210, which partitions persistent heap 202 from the remainder of memory 200, and static address 212, which partitions heap initial information structure 220 from static memory (e.g., including blocks 216-218). Processing circuitry may rely on static addresses 210 and 212 to partition and/or access portions of the memory 200. It is noted that all portions of memory 200 below static allocations (other) 218 may be stored in dynamic memory (e.g., DRAM), and all other portions of memory 200 may be stored in static memory (e.g., SRAM). However, in other embodiments, heap initial information structure 220 may be stored in static memory. Thus, the allocated memory blocks may be stored by processing circuitry in a dynamic portion of the memory 200, and the heap initial information structure 220 may be stored in a dynamic or a static portion of the memory 200.

In some embodiments, the device update includes a static location of heap initial information structure 220. For example, the first firmware or configuration and the second firmware or configuration are both configured to store heap initial information structure 220 at a fixed address or location. Having a static location of heap initial information structure 220 may permit the first firmware (or other initial configuration) to be compatible with the second firmware (or other final configuration) of the device. As used herein, being compatible means at least allowing the second firmware or configuration to use the persisted memory. In some embodiments, this fixed address or location may be the highest location (e.g., with respect to the depiction of memory 200 in FIG. 2) in the static portion of memory 200. In other words, heap initial information structure 220 may be stored at or near a boundary of the static portion of memory 200, where the boundary separates the static portion of memory 200 from the dynamic portion of memory 200.

Memory 200 may be illustrative of a memory allocation existing on a device before and/or after an update. Comparing the pre-updated and post-updated configurations of the device, memory 200 may be structured the same (e.g., with a static size allocation) in each configuration, with a portion of the memory having been persisted through an update and another portion of the memory having been erased and rewritten during the update. Memory 200 may also differ between the two configurations. For example, a number of allocated blocks, a size of the allocated blocks, a number of free blocks, an amount of free space, a number of portions of metadata, or any other specific implementations of memory 200 may differ between the configurations. In some embodiments, as mentioned, heap initial information structure 220 permits different configurations of memory 200 between the two configurations, based at least on providing information that processing circuitry can use to access allocated blocks.

Figure 3:
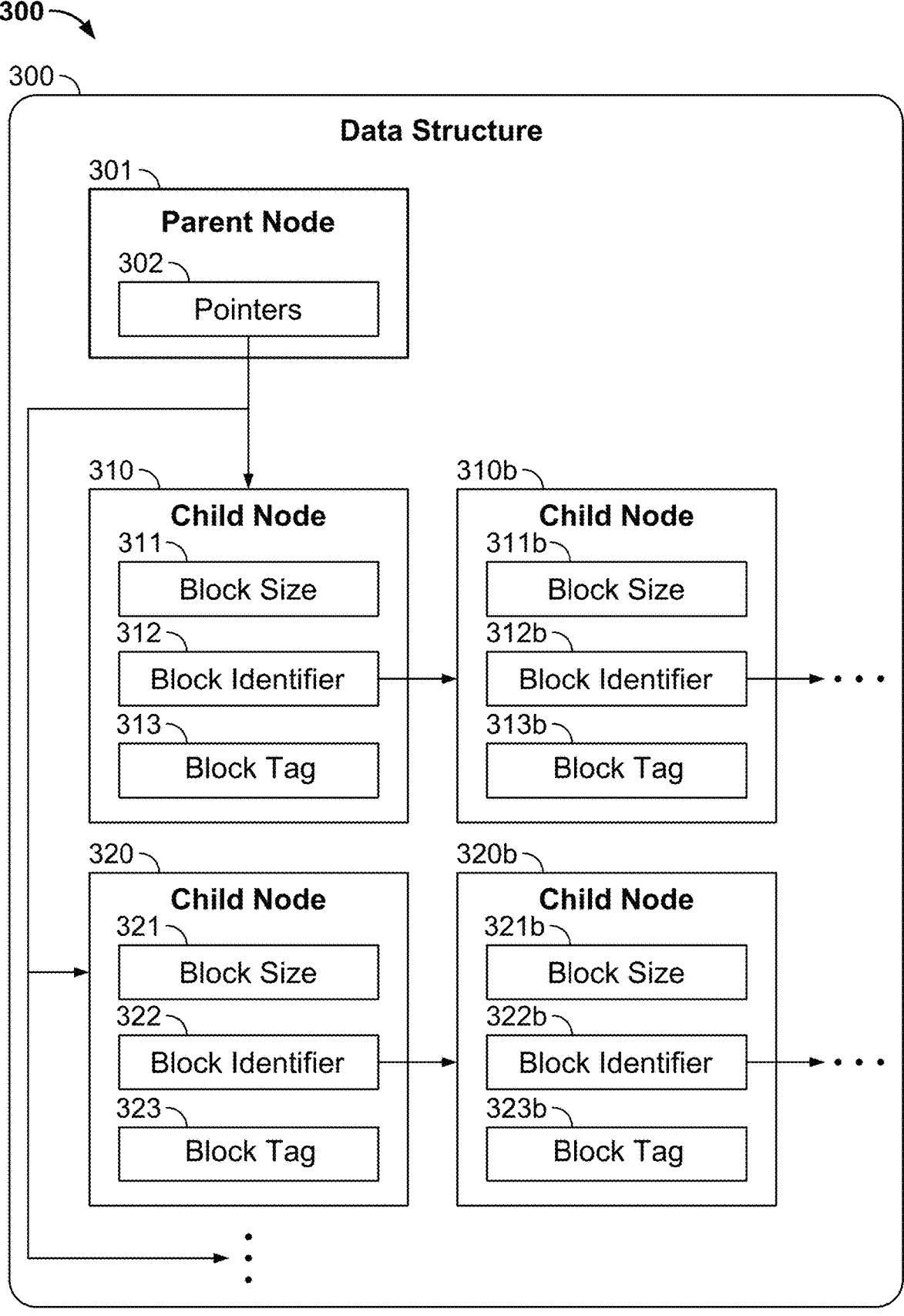
FIG. 3 shows a data structure, in accordance with some embodiments of the present disclosure.

FIG. 3 shows a data structure for persisting memory through a device update, in accordance with some embodiments of the present disclosure. In some embodiments, data structure 300 corresponds to data structures 250 (or a subset thereof, e.g., heap initial information structure 220). In some embodiments, data structure 300 is stored in memory 106 or memory 200.

Data structure 300 includes parent node 301 and one or more child nodes (e.g., child nodes 310 and 310b, child nodes 320 and 320b, and other possible child nodes indicated by the " . . . "). In some embodiments, parent node 301 corresponds to heap initial information structure 220 and each child node corresponds to a respective portion of metadata. For example, child node 310 may correspond to heap metadata 205 (with block size 311, block identifier 312, and block tag 313 respectively corresponding to block size 231, next block 232, and unique block tag 233). Child node 320 may similarly correspond to heap metadata 209 or any other heap metadata. Pointers 302 of parent node 301 indicate respective locations of each child node. In some embodiments, pointers 302 may correspond to first free block 222 and first allocated block 223. In some embodiments, pointers 302 may also include free space 221.

In some embodiments, data structure 300 includes one or more linked lists. In some embodiments, a linked list includes at least parent node 301 (or at least one pointer of pointers 302) and a corresponding row of child nodes (e.g., child node 310, child node 310b, and other possible child nodes as indicated by the " . . . "). For example, a first entry in the linked list may be a respective pointer of pointers 302, or the first entry may be the object (e.g., child node 310 or block identifier 312, or child node 320 or block identifier 322) at which the respective pointer points. A subsequent entry in the linked list may be a subsequent child node (e.g., child node 310b or child node 320b) or block identifier (e.g., block identifier 312b or block identifier 322b). In some embodiments, the respective child node or block identifier is a pointer to a subsequent child node or block identifier. The linked list may track allocated memory blocks, free memory blocks, or both.

Thus, data structure 300 maintains information about memory blocks (e.g., the free and allocated memory blocks of persistent heap 202) using parent node 301, based on the pointers 302 to multiple child nodes (e.g., child node 310, child node 320, and other possible child nodes indicated by the " . . . "). Each child node of the multiple child nodes is associated with a respective memory block (e.g., an allocated memory block or a free memory block) of the memory blocks and includes multiple values. The multiple values includes a size (e.g., block size 311 or 321) of the respective memory block, an identifier (e.g., block identifier 322, which may be a pointer to a subsequent allocated or free memory block) for a memory block that is subsequent to (e.g., physically adjacent to, or which follows in the linked list of memory block identifiers) the respective memory block, and a respective block tag (e.g., block tag 323) that is associated with the respective memory block.

In some embodiments, the pointers 302 to multiple child nodes include pointers to a first allocated block (e.g., allocated memory block 1 204, e.g., which may correspond to child node 310) of the memory blocks and a first free block (e.g., free block 208, e.g., which may correspond to child node 320) of the memory blocks. In some embodiments, pointers 302 provide additional connections to additional child nodes or other information (e.g., a value including or indicating an amount of free space of the memory), as indicated by the " . . . ". In some embodiments, following the pointer to the first allocated or free memory block, the linked list or other suitable data structure proceeds to sequentially store data about subsequent allocated or free memory blocks (e.g., as indicated by child node 310b, child node 320b, and the " . . . ").

In some embodiments, data of the respective block tag (e.g., block tag 313 or block tag 323) indicates whether to persist, during an update from a first firmware to a second firmware, data of the respective corresponding memory block.

Figure 4:
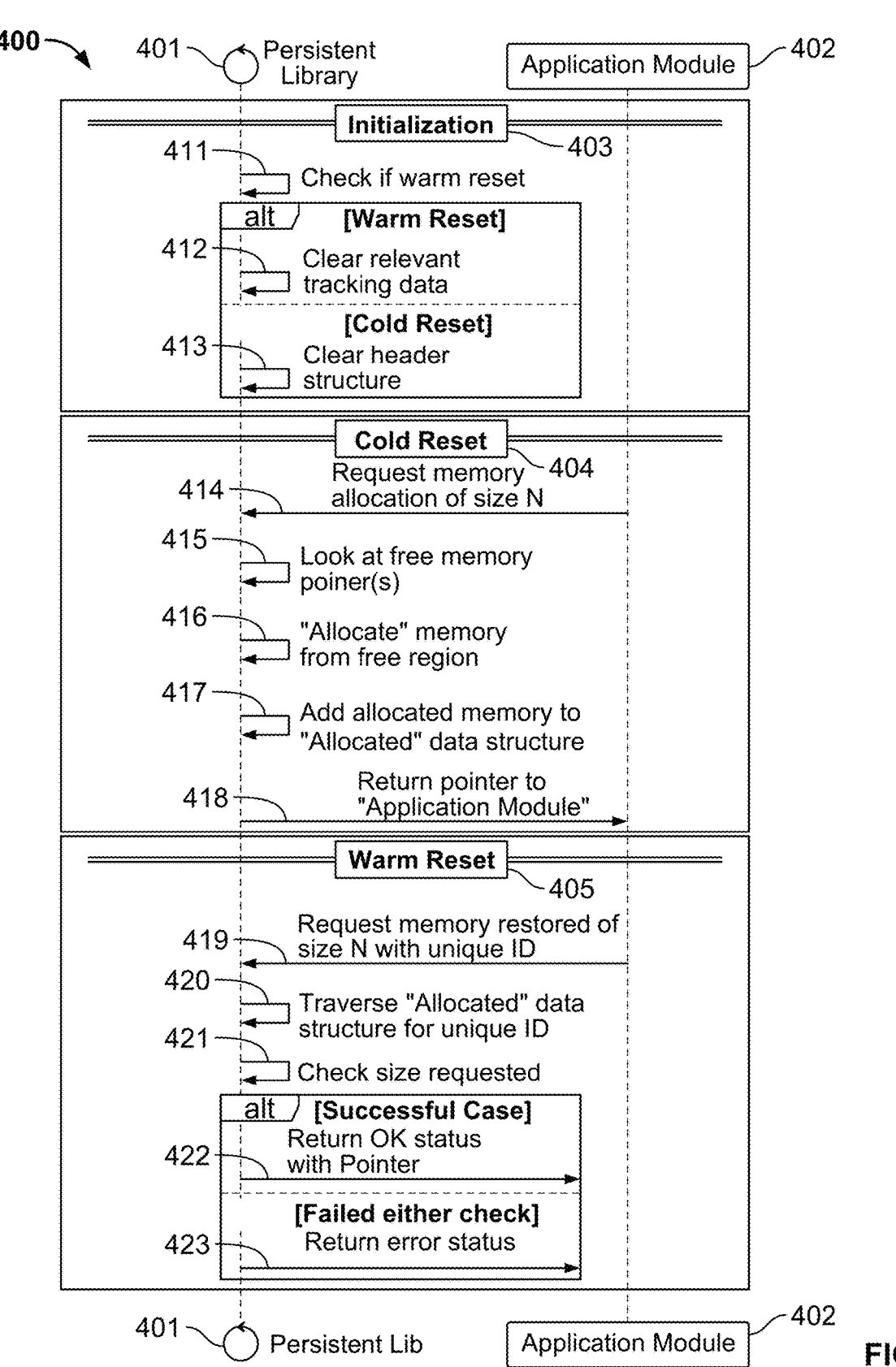
FIG. 4 shows a flowchart of illustrative steps for performing a reset with a device update, in accordance with some embodiments of the present disclosure.

FIG. 4 shows a flowchart of illustrative steps for performing a warm reset or a cold reset and for performing a corresponding device update, in accordance with some embodiments of the present disclosure. In some embodiments, method 400 is performed by processing circuitry 104, in response to receiving instructions 114 from host 108, to update firmware on storage device 102. The update process includes reading from memory 106 (e.g., reading metadata 122) to determine which portions of memory 106 (e.g., which blocks of heap memory 120) can be persisted through the execution of method 400. The update process also includes erasing portions of memory 106 (including portions of heap memory 120) that should not be persisted and writing to portions of memory 106 new data.

Method 400 includes interactions (e.g., writing to, reading from, erasing from, or any combination thereof) with persistent library 401 and application module 402, as indicated by arrows pointing to the respective dashed lines that extend vertically from the persistent library and the application module identifiers. The method 400 includes at least three sets of grouped operations, including initialization 403, cold reset 404, and warm reset 405. In some embodiments, based on an outcome of initialization 403, processing circuitry may proceed to execute one of a cold reset 404 or a warm reset 405, and the other set of grouped operations may or may not be executed during the execution of method 400.

During initialization 403, processing circuitry checks, at 411, if the reset is a warm reset. If the reset is a warm reset, then method 400 proceeds to 412, where processing circuitry clears relevant tracking data from the storage device, and then method 400 proceeds to 419. However, if the rest is a cold reset, then method 400 proceeds to 413, where processing circuitry clears a header structure of the storage device, and then method 400 proceeds to 414.

During cold reset 404, processing circuitry requests, at 414, memory with an allocation size N (where N represents any suitable memory size, e.g., corresponding to at least one memory block or corresponding to the collective size of at least two memory blocks). At 415, processing circuitry looks at one or more free memory pointers (e.g., pointers 302, or any other suitable indicator of an address of free block 208). At 416, processing circuitry allocates memory from a free region. Allocating memory may include writing data to the memory, or otherwise partitioning or reserving a memory block such that processing circuitry can subsequently write data to the memory. At 417, processing circuitry adds the allocated memory to the allocated data structure (e.g., heap initial information structure 220 or parent node 301, e.g., a linked list). At 418, processing circuitry returns a pointer (e.g., one of pointers 302, or a first free block 222 or a first allocated block 223) to the application module 402. In some embodiments, the pointer corresponds to the information added to the allocated linked list. In some embodiments, application module 402 makes the pointer available to other applications of the device.

During warm reset 405, processing circuitry requests, at 419, restored (e.g., persisted, or to-be-persisted) memory with an allocation size N and with one or more unique ID (e.g., unique block tag 233 or 243, block tag 313 or 323, or any other suitable unique block tag or unique ID). At 420, processing circuitry traverses (e.g., reads) the allocated data structure (e.g., heap initial information structure 220, parent node 301, e.g., a linked listed) to match the unique ID of 419 with one or more values stored in the data structure. At 421, processing circuitry determines whether a determined size at 420 is equal to the size requested at 419. For example, processing circuitry may determine a cumulative size of all portions of memory (e.g., allocated memory blocks) at 420 that are associated with the unique ID at 419, and may compare this cumulative size to the allocation size N at 419.

At 422, if the determination at 422 is successful (e.g., the determined size is equal to the requested size), then processing circuitry returns a successful ("OK") status indicator and returns at least one pointer (e.g., one of pointers 302, or a first free block 222 or a first allocated block 223) to the application module 402. In some embodiments, the at least one pointer indicates an address of a first allocated block 223 and/or a first free block 222, where these "first" positions are determined with respect to a memory allocation 200 that is associated with the post-updated configuration. In some embodiments, following the success indication at 422, the processing circuitry proceeds to cause the storage device to update from a first firmware to a second firmware, where the update includes persisting memory with the allocation size N and with the one or more unique ID specified at 419.

At 423, if the determination at 421 is not successful (e.g., the determined size is not equal to the requested size), then processing circuitry returns an error status indicator. In some embodiments, following the unsuccessful indication at 423, the processing circuitry proceeds to cause the device to abort the firmware update. In some embodiments, following the unsuccessful indication at 423, the processing circuitry requests (e.g., allocates) a new memory block from persistent library 401 and then reinitializes method 400 and/or reconstructs the memory (e.g., memory 106 or memory 200). In some embodiments, following the unsuccessful indication at 423, the processing circuitry proceeds to free any allocated portion of the memory that had a matching unique ID at 420 but did not have a matching allocation size N at 421.

FIG. 5 shows a flowchart of illustrative steps for persisting memory through a device update, in accordance with some embodiments of the present disclosure. In some embodiments, method 500 is performed by processing circuitry 104, in response to receiving instructions 114 from host 108, to update (e.g., from a first configuration to a second configuration, e.g., from a first firmware to a second firmware) storage device 102. The update process includes reading from memory 106 (e.g., reading metadata 122) to determine which portions of memory 106 (e.g., heap memory 120) can be persisted through method 500. The update process also includes erasing portions of memory 106 (including portions of heap memory 120) that should not be persisted and writing to portions of memory 106 new data that is associated with the update.

At 501, processing circuitry receives an instruction to update from a first configuration in a device to a second configuration, where a first heap memory (e.g., persistent heap 202) allocated to the first configuration includes a plurality of first allocated memory blocks (e.g., allocated memory block 1 204 and allocated memory block 2 206) and corresponding first memory blocks metadata (e.g., heap metadata 205 and heap metadata 207). In some embodiments, the instruction (e.g., instructions 114) includes an indication of whether to update using a cold reset or a warm reset. In some embodiments, the operations at 501 correspond to initialization 403. In some embodiments, processing circuitry performs the operations at 412 or 413 based on the indication included in the instructions. In some embodiments, a host (e.g., host 108) provides the instructions to a storage device (e.g., storage device 102).

At 502, processing circuitry performs a warm reset (e.g., warm reset 405) based on the instructions. In some embodiments, power is maintained to dynamic memory cells (e.g., DRAM) throughout the warm reset process, such that at least a portion (e.g., at least one allocated memory block) of the data stored in the dynamic memory cells may be persisted by processing circuitry through the operations of method 500.

At 503, performing the warm reset includes determining, based on the first memory blocks metadata (e.g., based on unique block tag 233 or 243, based on block tag 313 or 323, or based on other suitable metadata) that when updating from the first configuration to the second configuration, data of at least one of the first allocated memory blocks should be persisted to a second heap memory allocated to the second configuration. In some embodiments, the second heap memory is persistent heap 202, or a heap memory that is comparable to persistent heap 202. In some embodiments, persisting, based on the first memory blocks metadata, the data of at least one of the first allocated memory blocks, is further based on at least one property of the second configuration. For example, the update request 110, data 112, and/or instructions 114 may include at least one property of the second configuration that can be identified based on the first memory blocks metadata and that can be used to determine that at least one memory block should be persisted.

At 504, performing the warm reset additionally includes causing the device to update from the first configuration to the second configuration, where the update includes persisting, based on the first memory blocks metadata, the data of at least one of the first allocated memory blocks to a second heap memory allocated to the second configuration. In some embodiments, persisting the data accelerates the warm reset process (e.g., due to reducing a number of write and erase operations) compared to a process that does not persist the data.

In some embodiments, the method 500 also includes dividing (e.g., partitioning) the first heap memory into at least two portions of the first heap memory by assigning a static address (e.g., static address 211) between respective portions of the at least two portions of the first heap memory. A first portion of the at least two portions includes the at least one first allocated memory block (e.g., allocated block 1 204) storing the data that should be persisted, and a second portion of the at least two portions includes at least one first allocated memory (e.g., allocated block 2, 206) storing data that should not be persisted.

In some embodiments, the second heap memory (e.g., persistent heap 202) allocated to the second configuration includes a second group of allocated memory blocks (e.g., allocated block 1 204 or allocated block 2 206), and method 500 also includes, during or after performing the warm reset, generating second memory blocks metadata (e.g., heap metadata 205, 207, and/or 209) corresponding to the second allocated memory blocks that are allocated to the second configuration. The method 500 also includes generating a second data structure (e.g., a heap initial information structure 220) storing data (e.g., free space 221, first free block 222, and first allocated block 223) that is associated with the second memory blocks metadata, storing the second memory blocks metadata in the second heap memory allocated to the second configuration, and storing the second data structure in memory (e.g., memory 106) of the device.

Thus it has been shown that systems, methods, and data structures are provided for persisting memory through a device update. While the device update of the present disclosure is provided primarily in the context of changing from one firmware to another firmware in a device, it will be understood that changing the firmware is merely illustrative. Any change in configuration of the device, from one configuration to another configuration, that relies on a warm reset is within the scope of the present disclosure. For example, the device update may include installing a new firmware that does not explicitly replace a firmware that was previously installed on the device. For another example, the device update may include reconfiguring memory of the device, without installing a new firmware.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method for updating a device, the method comprising:

receiving an instruction to update from a first configuration of the device to a second configuration of the device, wherein:

a first heap memory allocated to the first configuration comprises a plurality of first allocated memory blocks and corresponding first memory blocks metadata, and the instruction comprises an indication of whether to update using a cold reset or a warm reset; and performing the warm reset based on the indication, wherein performing the warm reset comprises:

determining, based on the first memory blocks metadata, that when updating from the first configuration to the second configuration, data of at least one of the first allocated memory blocks should be persisted to a second heap memory allocated to the second configuration, dividing the first heap memory into at least two portions of the first heap memory by assigning a static address between respective portions of the at least two portions of the first heap memory, wherein:

a first portion of the at least two portions comprises at least one first allocated memory block storing the data that should be persisted; and a second portion of the at least two portions comprises at least one second allocated memory storing data that should not be persisted, and causing the device to update from the first configuration to the second configuration, wherein the update comprises persisting, based on the first memory blocks metadata, the data of at least one of the first allocated memory blocks to a second heap memory allocated to the second configuration.

2. The method of claim 1, wherein:

memory of the device stores a first data structure;

the first data structure stores data that is associated with the first memory blocks metadata; and the determining that the data of at least one of the first allocated memory blocks should be persisted is based on reading the first data structure.

3. The method of claim 2, wherein:

the first data structure comprises pointers to respective metadata of the first memory blocks metadata;

reading the first data structure comprises following the pointers;

the first memory blocks metadata comprise respective block tags; and reading the first data structure comprises, based on following the pointers, reading the respective block tags.

4. The method of claim 1, wherein:

the second heap memory allocated to the second configuration comprises a second plurality of allocated memory blocks; and performing the warm reset further comprises:

generating second memory blocks metadata corresponding to the second plurality of allocated memory blocks;

generating a second data structure storing data that is associated with the second memory blocks metadata;

storing the second memory blocks metadata in the second heap memory allocated to the second configuration; and storing the second data structure in memory of the device.

5. The method of claim 4, wherein storing the second memory blocks metadata comprises storing respective portions of the second memory blocks metadata adjacent to a corresponding memory block of the second plurality of allocated memory blocks.

6. The method of claim 1, wherein persisting, based on the first memory blocks metadata, the data of at least one of the first allocated memory blocks, is further based on at least one property of the second configuration.

7. The method of claim 1, wherein the first configuration is based on a first firmware and the second configuration is based on a second firmware, different from the first firmware.

8. A system comprising:

a first heap memory allocated to a first configuration, the first heap memory comprising a plurality of first allocated memory blocks and corresponding first memory blocks metadata; and control circuitry coupled to the first heap memory, the control circuitry to:

receive an instruction to update from the first configuration to a second configuration, wherein the instruction comprises an indication of whether to update using a cold reset or a warm reset; and perform the warm reset based on the indication, wherein to perform the warm reset comprises:

determining, based on the first memory blocks metadata, that when updating from the first configuration to the second configuration, data of at least one of the first allocated memory blocks should be persisted to a second heap memory allocated to the second configuration, dividing the first heap memory into at least two portions of the first heap memory by assigning a static address between respective portions of the at least two portions of the first heap memory, wherein:

a first portion of the at least two portions comprises at least one first allocated memory block comprising the data that should be persisted; and a second portion of the at least two portions comprises at least one second allocated memory comprising data that should not be persisted, and causing a device to update from the first configuration to the second configuration, wherein the update comprises persisting, based on the first memory blocks metadata, the data of at least one of the first allocated memory blocks to a second heap memory allocated to the second configuration.

9. The system of claim 8, wherein:

memory of the device comprises a first data structure;

the first data structure comprises data that is associated with the first memory blocks metadata; and the control circuitry is further to determine that the data of at least one of the first allocated memory blocks should be persisted based on reading the first data structure.

10. The system of claim 9, wherein:

the first data structure comprises pointers to respective metadata of the first memory blocks metadata;

the first memory blocks metadata comprise respective block tags; and the control circuitry is further to:

follow the pointers when reading the first data structure, and read the respective block tags based on following the pointers.

11. The system of claim 8, wherein:

the second heap memory allocated to the second configuration comprises a second plurality of allocated memory blocks; and the control circuitry is further to perform the warm reset by:

generating second memory blocks metadata corresponding to the second plurality of allocated memory blocks;

generating a second data structure storing data that is associated with the second memory blocks metadata;

storing the second memory blocks metadata in the second heap memory allocated to the second configuration; and storing the second data structure in memory of the device.

12. The system of claim 11, wherein the control circuitry is further to store respective portions of the second memory blocks metadata adjacent to a corresponding memory block of the second plurality of allocated memory blocks.

13. The system of claim 8, wherein the control circuitry is further to persist the data of at least one of the first allocated memory blocks further based on at least one property of the second configuration.

14. The system of claim 8, wherein the first configuration is based on a first firmware and the second configuration is based on a second firmware, different from the first firmware.

15. A memory for maintaining information about memory blocks, the memory comprising:

a plurality of memory blocks; and a data structure comprising:

a parent node comprising pointers to a plurality of child nodes; and the plurality of child nodes, wherein each child node of the plurality of child nodes is associated with a respective memory block of the plurality of memory blocks and comprises a plurality of values comprising:

a size of the respective memory block, an identifier for a subsequent memory block to the respective memory block, and a respective block tag associated with the respective memory block, wherein data of the respective block tag indicates whether to persist, during an update from a first configuration to a second configuration, data of the respective memory block.

16. The memory of claim 15, wherein:

the pointers to the plurality of child nodes comprise respective pointers to a first allocated block of the memory blocks and a first free block of the memory blocks; and the data structure comprises at least one linked list, the at least one linked list comprising the first allocated block of the memory blocks and at least one subsequent allocated block of the memory blocks, wherein at least one pointer of the pointers points to the at least one linked list.

17. The memory of claim 16, wherein the parent node further comprises a value comprising an amount of free space in the memory blocks.

* * * * *